May 16, 1939. J. H. BRADBURY 2,158,054
GEAR BOX
Filed Dec. 9, 1936 4 Sheets-Sheet 1

Inventor:-
John H. Bradbury
By his Attorney.

May 16, 1939.  J. H. BRADBURY  2,158,054
GEAR BOX
Filed Dec. 9, 1936  4 Sheets-Sheet 2

Inventor:-
John H. Bradbury
Walter Gunn
By his Attorney.

May 16, 1939.　　　J. H. BRADBURY　　　2,158,054
GEAR BOX
Filed Dec. 9, 1936　　　4 Sheets-Sheet 3

Inventor:-
John H. Bradbury
Walter Gunn
By his Attorney.

May 16, 1939. J. H. BRADBURY 2,158,054
GEAR BOX
Filed Dec. 9, 1936 4 Sheets-Sheet 4

Inventor:-
John H. Bradbury
Walter Gunn

By his Attorney.

Patented May 16, 1939

2,158,054

UNITED STATES PATENT OFFICE 2,158,054

GEAR BOX

John Henry Bradbury, Ashton-on-Mersey, England

Application December 9, 1936, Serial No. 114,996
In Great Britain December 13, 1935

4 Claims. (Cl. 74—297)

This invention relates to gear boxes and more particularly to gear boxes of the kind embodying two or more friction clutch members operated for engagement by fluid pressure.

The object of the invention is an improved construction and arrangement of the parts of the gear with certain important features of advantage as hereinafter explained.

According to one feature of the invention the establishment of pressure to effect engagement of one, or one set of friction clutch members also effects positive disengagement of another or other friction clutch members.

According to another feature of the invention an epicyclic gear is incorporated, the driving and driven parts of which are journaled on the output or driven shaft.

According to a third feature of the invention means are provided for preventing rotation of the driven shaft while the clutch members are in a neutral position.

In the accompanying drawings:

Fig. 9 is a part section of the valve and passages on line 9—9 of Fig. 10, the valve being in neutral position.

Figure 1:
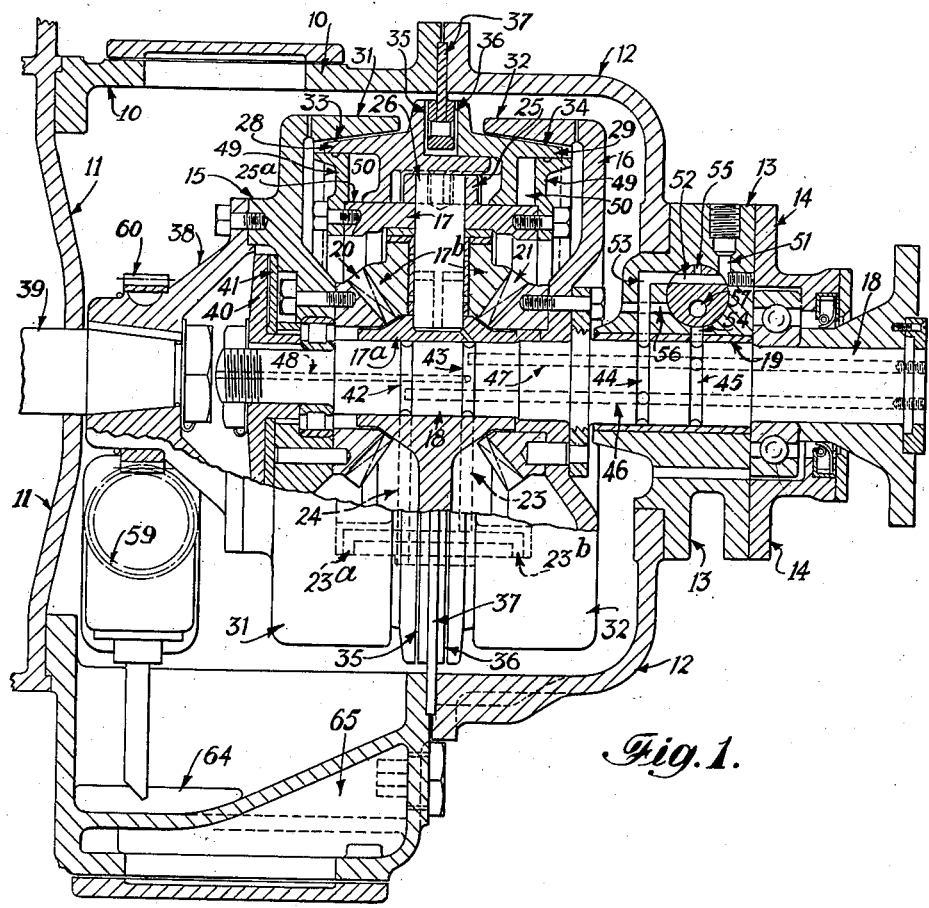
Fig. 1 is a sectional longitudinal elevation of one example of gear made in accordance with the invention.

As illustrated in Fig. 1, the gear comprises a main casing 10 which bolts to the engine crank case 11, a front cover 12, a bearing block 13 in which is incorporated the control valve and a thrust bearing and oil seal unit 14.

Figure 2:
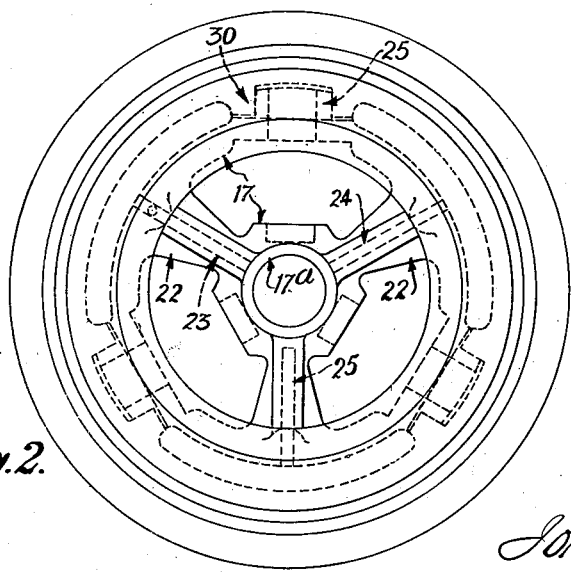
Fig. 2 is an end elevation of the planet wheel carrier and one inner clutch member mounted thereon.

Within the casing is an epicyclic gear comprising a driving member 15, driven member 16 and planet wheel carrier 17. The driving member 15, driven member 16 and planet wheel carrier 17 are journaled and assembled as a unit on the driven shaft 18, which is journaled in a bush 19 in the bearing block 13. Bevel pinion wheels 20 and 21 are respectively bolted to the driving and driven members 15 and 16. The planet wheel carrier 17 is formed with a long hub 17a, and is shown constructed for 3 planetary pinions 17b (see also Fig. 2). The carrier is made as a casting or drop forging with 3 radial spokes 22 in two of which are formed oil passages 23 and 24, while the third is drilled blind for balance. The planet carrier has 3 rectangular bosses 25 on its periphery and at each side thereof is a broad machined wheel-like rim 25a. The bosses 25 are drilled to receive the bearing spindles 26 of the planet wheels 27. On the rims 25a of the carrier are slidably mounted clutch members 28 and 29 which have driving lugs 30 engaging one or more of the square bosses 25. The driving and driven members 15 and 16 have overhanging conical rims 31 and 32 respectively which are adapted to be frictionally engaged by the conical outer peripheries 33 and 34 of the clutch members 28 and 29. The two sliding clutch members 28 and 29 are formed with opposing annular clutch faces 35 and 36 adapted to engage a brake ring 37 clamped between the main casing 10 and the cover 12. The driving member 15 is secured by a coupling flange 38 to the end of the engine crank shaft 39. On the inner end of the driven shaft 18 is secured a collar 40 between which and the rear face of the driving member 15 is a phosphor bronze thrust ring 41.

On the periphery of the driven shaft 18 are four annular oil grooves 42, 43, 44 and 45 respectively arranged in pairs. In the shaft is an oil passage 46 connecting 42 and 44 and another oil passage 47 connecting the grooves 43 and 45. There is a further oil passage 48 connecting the groove 43 with the space at the inner end of the shaft 18. The oil passage 23 in the carrier is drilled so as to register with the groove 43 while the passage 24 registers with the groove 42.

As shown in Fig. 1 the oil passage 23 is branched to form two outlets 23a and 23b which are outside the bearing portions of the clutch members on the rims 25a. On the other hand, the passage 24 is drilled so as to be in the centre and between the bearing portions of the clutch members on the rims 25a.

At each side of the planet-wheel carrier are secured oil retaining plates 49 over the periphery of which the clutch members 28 and 29 slide and which form enclosing oil chambers 50 into which the passages 23a and 23b open.

Return springs (not shown) may be provided on each side of each clutch member acting to centralise them in the neutral position.

Figures 3, 5:
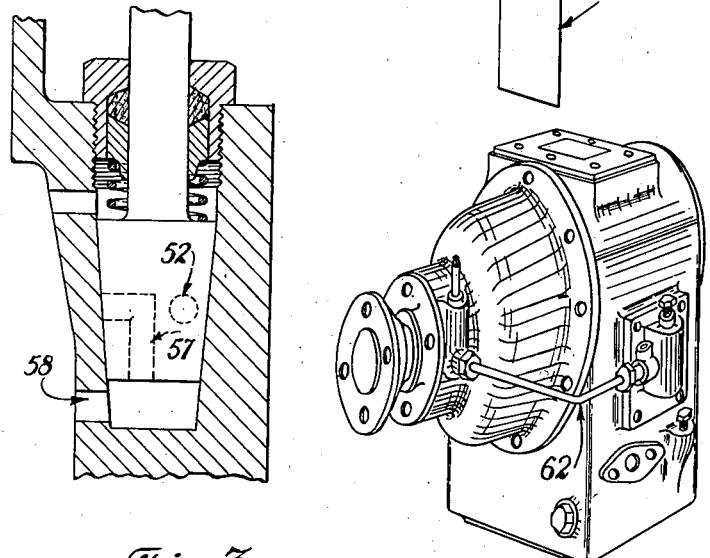
Fig. 3 is a sectional view of the control valve.
Fig. 5 is a perspective exterior elevation of the gear.

In the bearing block 13 is a 3-way valve which is shown in Fig. 1 diagrammatically at right angles to its actual position so that its function may be more easily followed. The oil enters by the passage 51 and in the valve is a passage 52, adapted to join the passage 51 with either of two passages 53 and 54 or to join those two latter passages together. The passages 53 and 54 communicate with the grooves 44 and 45 respectively in the shaft 18. There is also a small release port 55 communicating with the passage 52 and adapted to register with a port 56 communicating with the interior of the main casing. In the valve is also a passage 57 adapted to register in turn with one of the passages 51, 53 and 54 when the other two are connected, and as shown in Fig. 3 communicates through the end of the valve with a port 58 which is connected to the interior of the main casing.

Figure 4:
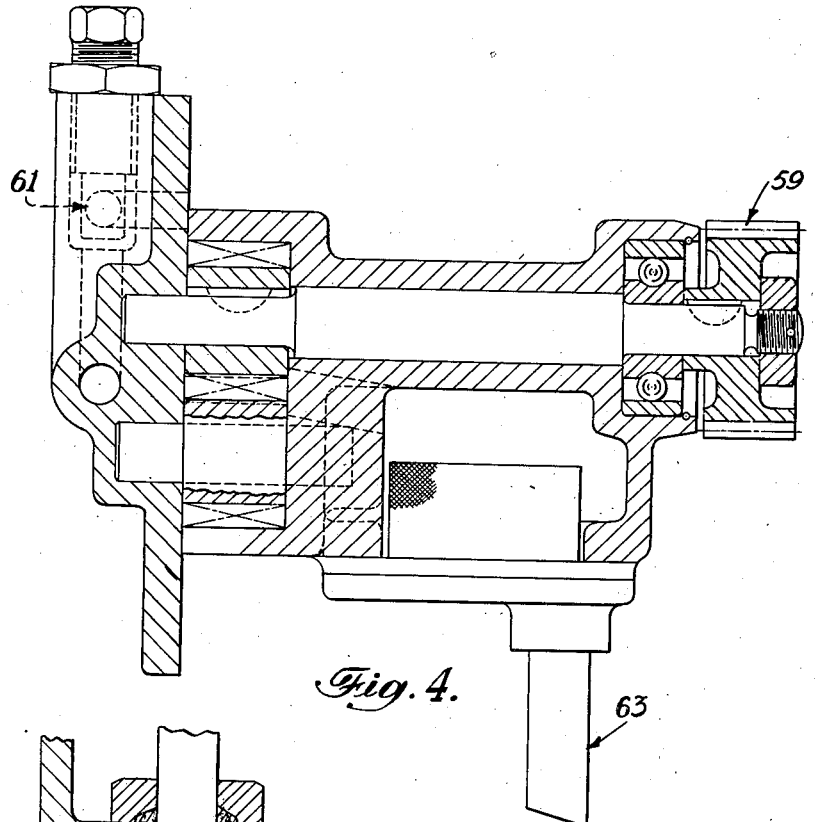
Fig. 4 is a sectional elevation of the oil pump.

The pump as shown in Fig. 4 is of the gear type having a skew pinion 59 adapted to engage a skew pinion 60 formed on the coupling flange 38. The unit, which can be inserted or removed from the side of the main casing incorporates a release valve 61 and the pump outlet is connected by a pipe 62 (see Fig. 5) to the passage 51. The pump inlet pipe is fitted with a depending pipe 63 which picks up the oil from a gear box sump 64 secured to the bottom of the main casing and having a water cooling passage 65. Any oil entering the main space of the main casing drains into the sump through suitable passages.

In operation, forward and direct drive is obtained with the valve in position shown in Fig. 1. Oil under pressure from the pump passes through passages 51, 52 and 53 into the groove 44 through 46 to groove 42, up the passage 24 and into the space between the bearing portions of the clutch members. Oil in the oil chambers 50 is not under pressure as any pressure is released through passage 23, groove 43, passage 47 to groove 45, passage 54, passage 57 in the valve and port 58, back to the interior of the main casing.

Whilst the gear is engaged for forward drive, oil under pressure also passes through the oil passage 48 from the groove 43 and acting on the collar 40 causes it to engage frictionally with the thrust ring 41. There is no relative rotation between these parts whilst in forward gear but a steadying or clamping action is obtained to damp out any whip or oscillation in the shaft 18 ensuring a smooth and quiet drive.

If the valve is now turned through 120 degrees in a clockwise directtion the gear will be in reverse. Oil pressure is now supplied to the oil chambers 50 causing the clutch members to move and engage the brake ring 37 while the oil space between the clutch members is open to the interior of the main casing through the port 58. In fact the oil pressure is transferred from the passage 53 to the passage 54 and the passage 54 is open to the passage 57 and port 58 instead of the passage 53 being so open.

If the valve is turned through a further 120 degrees, both passages 53 and 54 are in communication with each other through the passage 52 in the valve and with the main casing through the release port 55 and port 56.

Figures 6, 7:
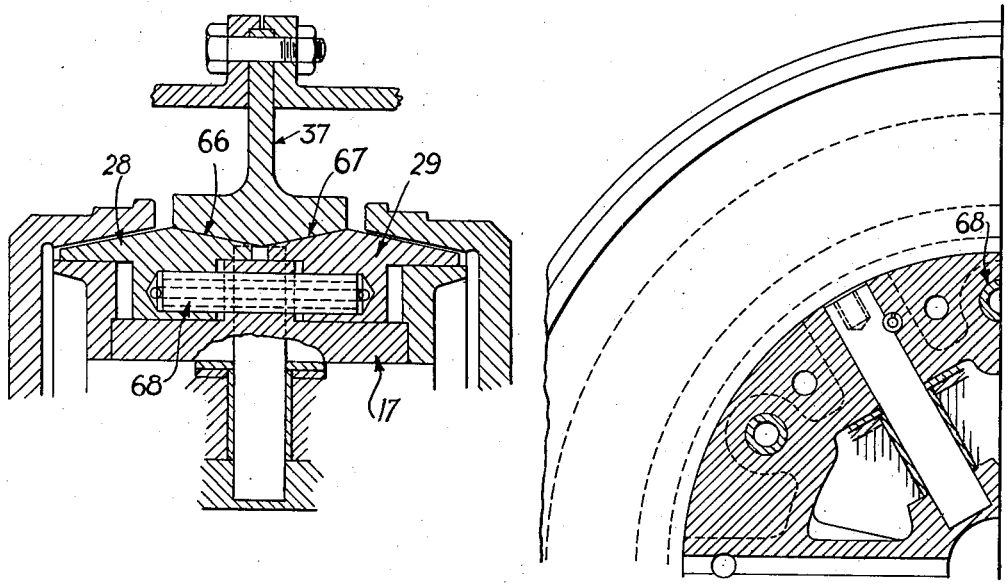
Fig. 6 is a part sectional longitudinal elevation showing a modification of the clutch members.
Fig. 7 is a central part section showing the planetary member of Fig. 6.

As shown in Fig. 6, instead of the opposing clutch faces 35 and 36, the clutch members 28 and 29 are formed with conical brake faces 66 and 67 and the brake ring 37 is formed with co-acting conical faces. Also, as a constructional modification, the planet carrier 17 is fitted with driving pins 68 in place of the bosses 25 of Fig. 1. The clutch members 28 and 29 are drilled to fit slidably on the ends of the driving pins and this forms a simple and cheap construction. The same arrangement of oil chambers and oil passages are provided as in Fig. 1, for moving the clutch members. The disposition of the driving pins 68 relative to the planetary pinions is shown in Fig. 7 and it will be seen that the pins are hollow and suitable oil passages are provided to prevent dash-pot action of the pins in the holes of the clutch members.

Figures 8, 10:
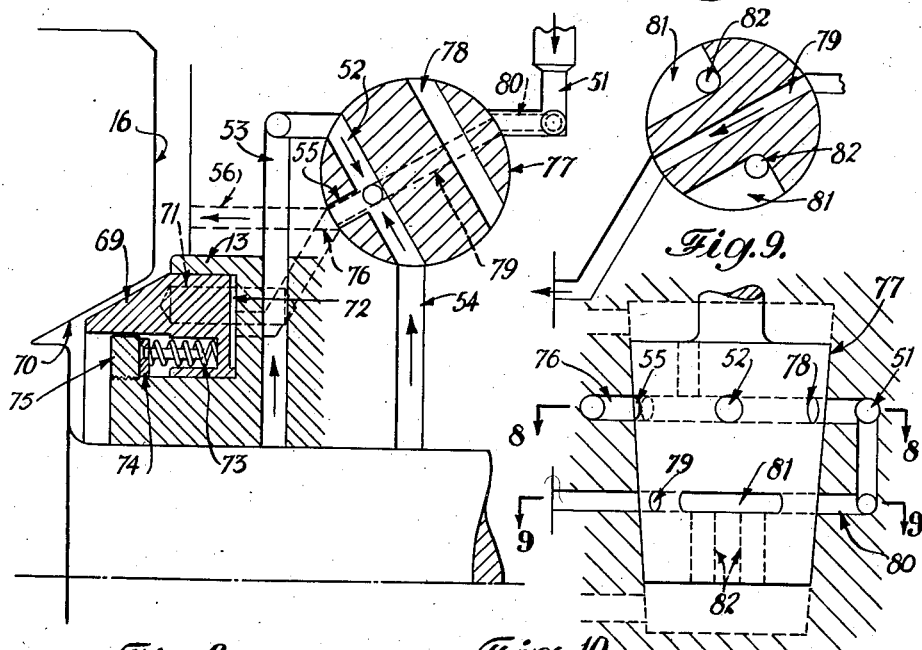
Fig. 8 shows a modification of an additional clutch member applicable to Fig. 1 or as modified in Fig. 6 and showing also a modified valve in diagrammatic arrangement and part section on line 8—8, Fig. 10, the valve being in neutral position.
Fig. 10 is an elevation of the modified valve of Fig. 8.

As shown in Fig. 8, the part 13 is modified to house a third sliding brake member 69 which engages the back of the driven member 16, the latter being given an increased overhang to provide a complementary friction face 70. This brake member 69 slides on pins 71 fixed in the part 13 as well as in a groove in the part 13, so as to form an oil chamber 72. The return movement of the brake member 69 is effected by springs 73 carried by a ring 74 and secured by a screw ring 75 screwing onto the end of the part 13. Communicating with the chamber 72 is a passage 76 leading to the valve. The valve 77, compared with the valve of Fig. 1, has an additional passage 78 symmetrically parallel with the passage 52 and in the same plane therewith, while in another plane is a diametrical passage 79, adapted at one end to register with the passage 76 and at the other end to register with a branch passage 80 of the passage 51. In the valve and on each side of the passage 79 are two deep slots 81 having passages 82 communicating with the end of the valve and forming pressure release ports registering with the passage 76.

In operation, with the valve in the position shown in Fig. 8, the two passages 53 and 54 are in communication with each other through the passage 52 in the valve, and also with the interior of the casing through the ports 55 and 56. The clutch members 28 and 29 are not therefore, forced by oil pressure for engagement of either of their clutch surfaces and the gear is in neutral. At the same time, oil pressure from 51 passes via the branch passage 80, diametrical passage 79 in the valve and passage 76 to the chamber 72 forcing the brake member 69 into engagement with the driven member 16. The driven member 16 is thus braked and held stationary, in the neutral position.

Figure 11:
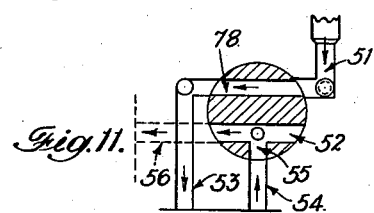
Figs. 11 and 12 are sections similar to Figs. 8 and 9 but with the valve turned one-sixth of a turn counter-clockwise to engage the gear clutch members for one direction of drive.
Figure 12:
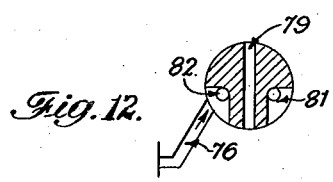

As shown in Figs. 11 and 12, when the valve is turned counter-clockwise through one-sixth of a turn, the oil pressure is admitted to the passage 53, while 54 is open to the interior of the casing and the passage 67 is also open through one of the slots 81 and passage 82 to the casing thus releasing the oil pressure in the chamber 72 and allowing the springs 73 to move the brake member 69 out of engagement with the driven member 16.

Figure 13:
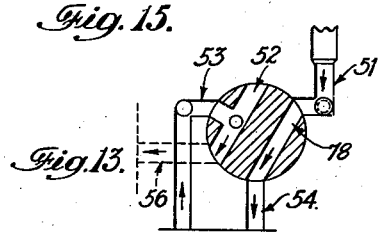
Figs. 13 and 14 are similar sections after the valve has been turned one-sixth of a turn clockwise from neutral to engage the gear clutch members for the other direction of drive.
Figure 14:
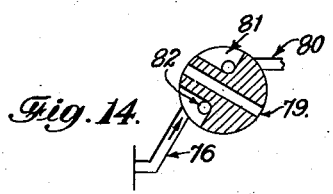

As shown in Figs. 13 and 14, a similar condition obtains except that the oil pressure is admitted to the passage 54 while the passage 53 is opened to the interior of the casing, thus engaging the other clutch members for the other direction of drive.

Figure 15:
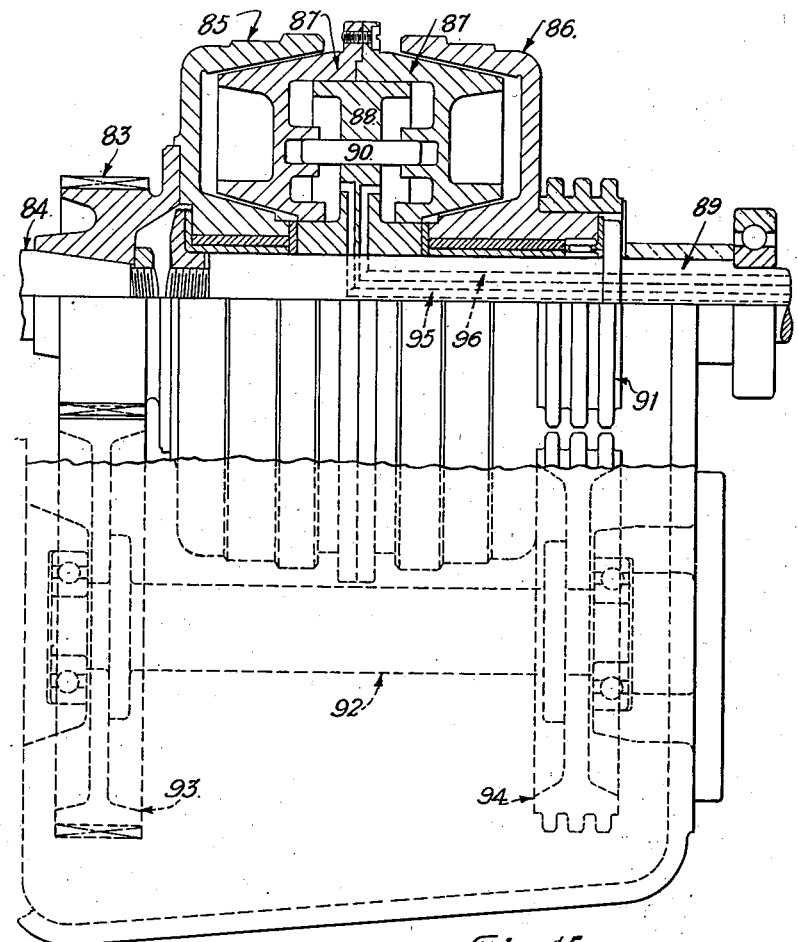
Fig. 15 shows another application of the gear to enable different gear ratio to be obtained for the different directions of drive.

As shown in Fig. 15, the improved gear comprises a gear wheel 83 secured to the engine shaft 84 and carrying a clutch drum 85. Opposite to the clutch drum 85 is a second clutch drum 86. Between these two clutch drums 85 and 86 is a two-part sliding clutch member 87 embracing a wheel-like central member 88 secured to the driven shaft 89. The member 88 has a peripheral flange as well as a hub on which the two parts of the clutch members have a sliding fit with the member 88. Relative rotation of the parts 87 and 88 is prevented by driving pins 90 fixed in the wheel member 88 and engaging holes in lugs on the inside of the two parts 87. Secured to the outside of the drum 86 is a chain wheel 91. The drums 85 and 86 are both journaled on the shaft 89 with rotational thrust bearings. On a countershaft 92 parallel to the coincident axes of the engine shaft 84 and driven shaft 89 are secured a gear wheel 93 meshing with the gear wheel 83, and a chain wheel 94 adapted to be connected to the chain wheel 91 by a chain not shown. In the shaft 89 are oil passages 95 and 96 leading to the oil pressure chambers on each side of the central member 88, whereby oil pressure may be supplied to either of such chambers to cause axial movement of the sliding member 87 bringing it into engagement in one direction with the drum 85 and in the other direction with the drum 86.

What I claim is:

1. Transmission gearing comprising a shaft, a centre carrier member on the shaft, clutch members slidably but relatively non-rotatably mounted on the carrier member, complementary non-sliding clutch members mounted beside each movable clutch member, the carrier member and sliding clutch members being shaped with sliding surfaces at two different diameters to form oil pressure chambers between the carrier member and each of the sliding clutch members, the shaft and carrier member having passages for supplying oil under pressure selectively to the said chamber, means for supplying oil under pressure selectively to said passages to impart sliding movement to the sliding clutch members, means permanently coupling one of the complementary non-sliding clutch members to the shaft for rotation therewith and planetary gear pinions carried by the carrier engaging with pinion wheels on the non-sliding clutch members to form an epicyclic train of gearing.

2. Transmission gearing comprising a shaft, a centre carrier member on the shaft, clutch members slidably but relatively non-rotatably mounted on the carrier member, complementary non-sliding clutch members mounted beside each movable clutch member, the carrier member and sliding clutch members being shaped with sliding surfaces at two different diameters to form oil pressure chambers between the carrier member and each of the sliding clutch members, the shaft and carrier member having passages for supplying oil under pressure selectively to the said chamber, means for supplying oil under pressure selectively to said passages to impart sliding movement to the sliding clutch members, means permanently coupling the carrier member to the shaft for rotation therewith, and external gearing coupling the two non-sliding clutch members for opposite rotation.

3. Transmission gearing comprising a shaft, a centre carrier member on the shaft, clutch members slidably but relatively non-rotatably mounted on the carrier member, complementary non-sliding clutch members mounted beside each movable clutch member, gearing coupling together the complementary non-sliding clutch members, the carrier member and sliding clutch members being shaped with sliding surfaces at two different diameters to form oil pressure chambers between the carrier member and each of the sliding clutch members, the shaft and carrier member having passages for supplying oil under pressure selectively to the said chamber, means for supplying oil under pressure selectively to said passages to impart sliding movement to the sliding clutch members, and a further sliding brake member mounted on the shaft bearing and restrained from rotation and adapted to engage one of the non-sliding clutch members, so as to stop rotation of the shaft, and means for selectively operating said further brake member while the other sliding clutch members are in a disengaged position.

4. Transmission gearing comprising a shaft, a carrier member on the shaft, clutch members slidably but relatively non-rotatably mounted on the carrier member, complementary non-sliding clutch members mounted beside the movable clutch members, gearing coupling together the complementary non-sliding clutch members, the carrier member and sliding clutch members being shaped with sliding surfaces at two different diameters to form an oil pressure chamber, the shaft and carrier members having a passage for supplying fluid under pressure to said chamber to impart sliding movement to the sliding clutch members to bring them into frictional engagement with their non-sliding clutch members.

JOHN HENRY BRADBURY.